(12) United States Patent
Margolin

(10) Patent No.: US 8,493,507 B2
(45) Date of Patent: Jul. 23, 2013

(54) GLARE BLOCKING CAMCORDER/CAMERA STABILIZING EYE LEVEL VIEWFINDER DEVICE AND METHOD

(76) Inventor: George Margolin, Newport Beach, CA (US)

( * ) Notice: Subject to any disclaimer, the term of this patent is extended or adjusted under 35 U.S.C. 154(b) by 280 days.

(21) Appl. No.: 12/814,436

(22) Filed: Jun. 11, 2010

(65) Prior Publication Data

US 2010/0321553 A1    Dec. 23, 2010

Related U.S. Application Data

(60) Provisional application No. 61/218,334, filed on Jun. 18, 2009.

(51) Int. Cl.
*H04N 5/225* (2006.01)
*H04N 5/222* (2006.01)

(52) U.S. Cl.
USPC ................................ 348/375; 348/333.01

(58) Field of Classification Search
USPC ............. 348/333.01, 333.06, 333.07, 333.08, 348/373, 375, 376; 396/373, 374, 535
See application file for complete search history.

(56) References Cited

U.S. PATENT DOCUMENTS

| | | | | |
|---|---|---|---|---|
| 4,865,420 A | * | 9/1989 | Schmidt | 359/601 |
| 6,419,367 B1 | * | 7/2002 | Dion et al. | 359/612 |
| 7,336,896 B2 | * | 2/2008 | Jutamulia | 396/287 |
| 7,486,887 B2 | * | 2/2009 | Tian | 396/544 |

OTHER PUBLICATIONS http://www.bhphotovideo.com/c/buy/LCD-Hoods/ci/6247/N/4294544846, Oct. 23, 2012.
http://www.bhphotovideo.com/c/product/687699-REG/Hoodman_HEXKP_EX1_Kit_Pro.html , Oct. 23, 2012.
http://www.hoodmanusa.com/prodinfo.asp?number=HD%2D300+VIDEO, Feb. 27, 2013.
http://www.hoodmanusa.com/prodinfo.asp?number=H%2D200, Feb. 27, 2013.

* cited by examiner

*Primary Examiner* — Nicholas Giles
(74) *Attorney, Agent, or Firm* — Lawrence S. Cohen

(57) ABSTRACT

A glare blocking viewfinder device includes a shadow box with a lens at a first end and an attachment mechanism at a second end adapted to detachably mount the device on a monitor screen of a camera. This enables a user to observe an image-bearing surface of the screen by looking at the image-bearing surface through the lens. The lens has a predetermined focal length and the depth dimension of the shadow box is substantially equal to this focal length. The attachment mechanism upon mounting the device to the monitor screen provides a substantially rigid structure. The user presses his or her eye against the lens to view the monitor screen through the lens and shadow box and points the camera at a subject, keeping the camera on the subject by using the device as a viewfinder. The user holds the camera with one hand and the attached device with the other hand. The device is collapsible and conveniently fits into a pocket of the user when not being used.

12 Claims, 17 Drawing Sheets

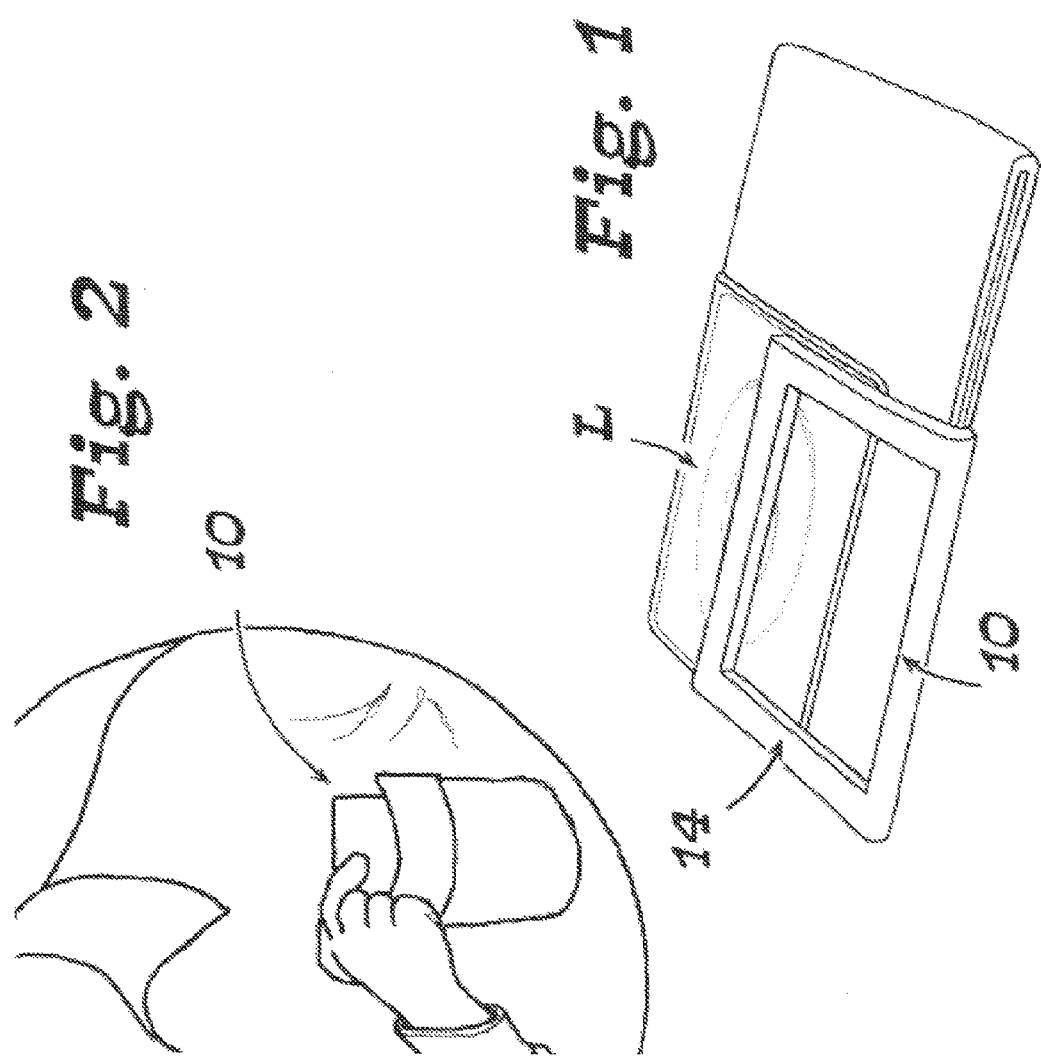

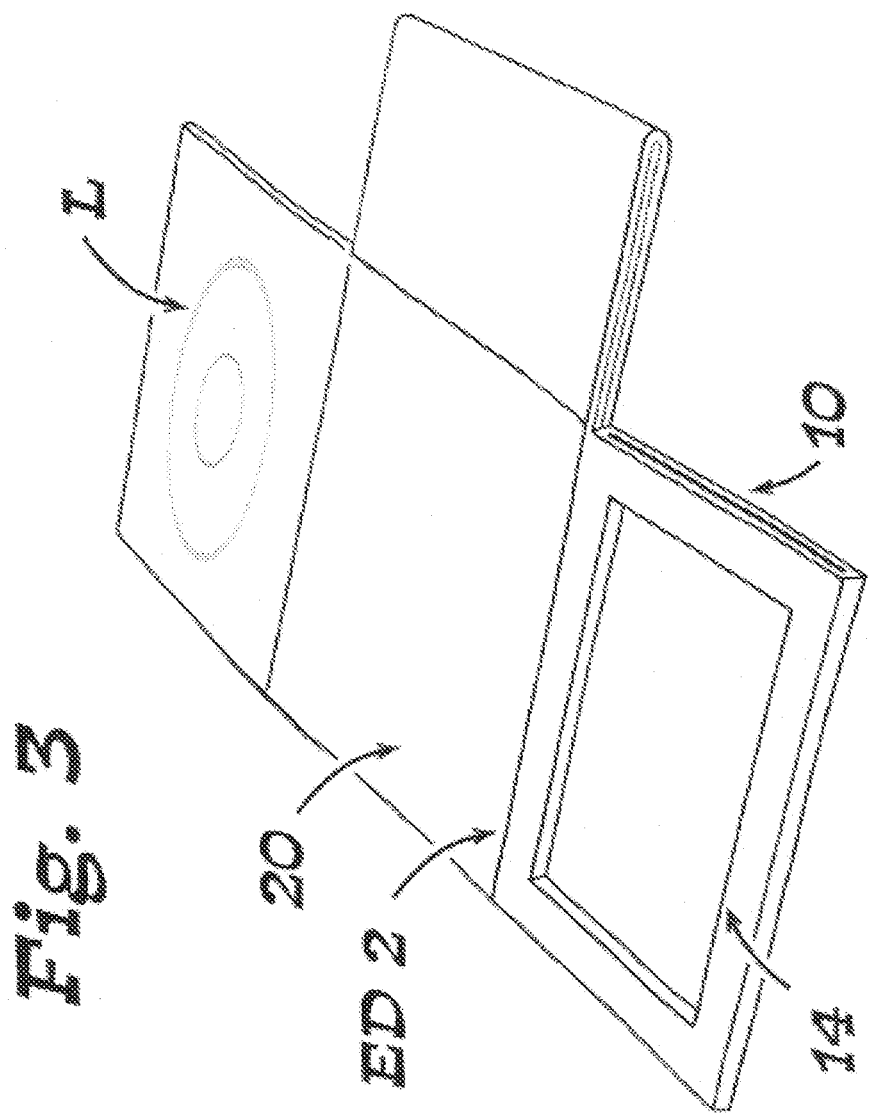

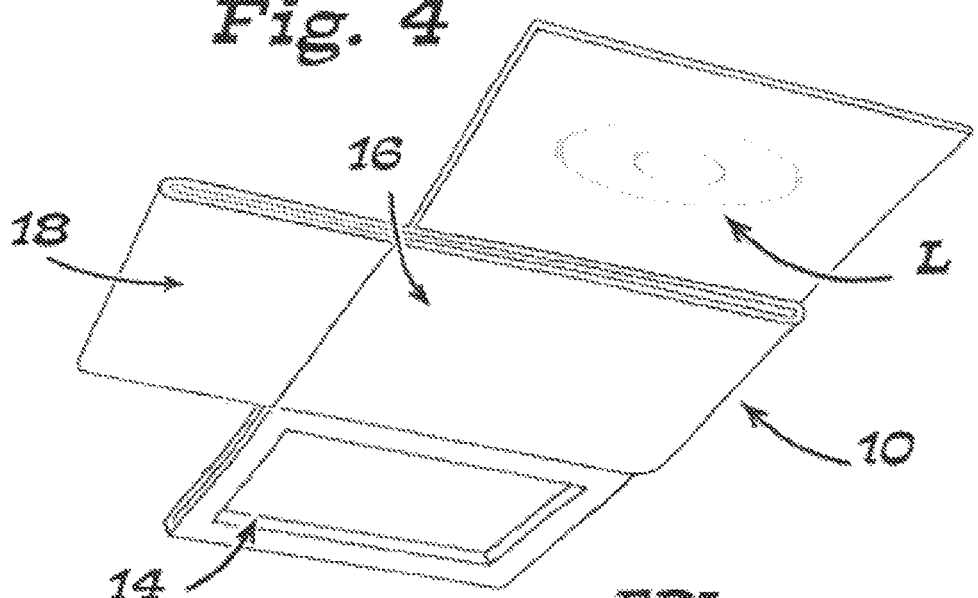
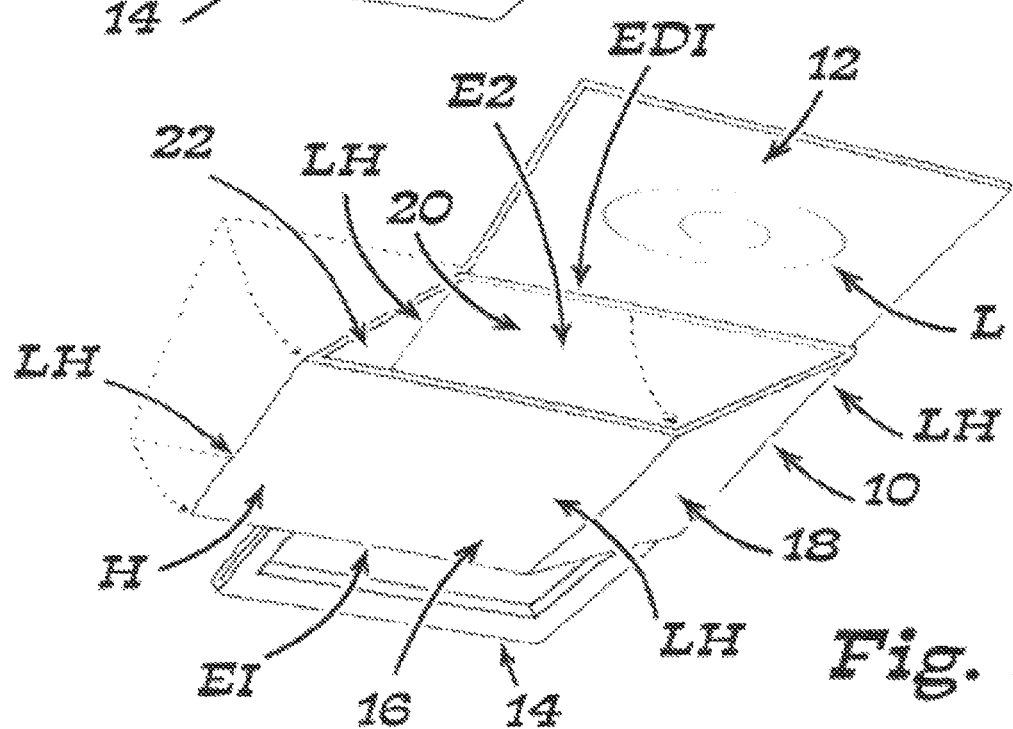

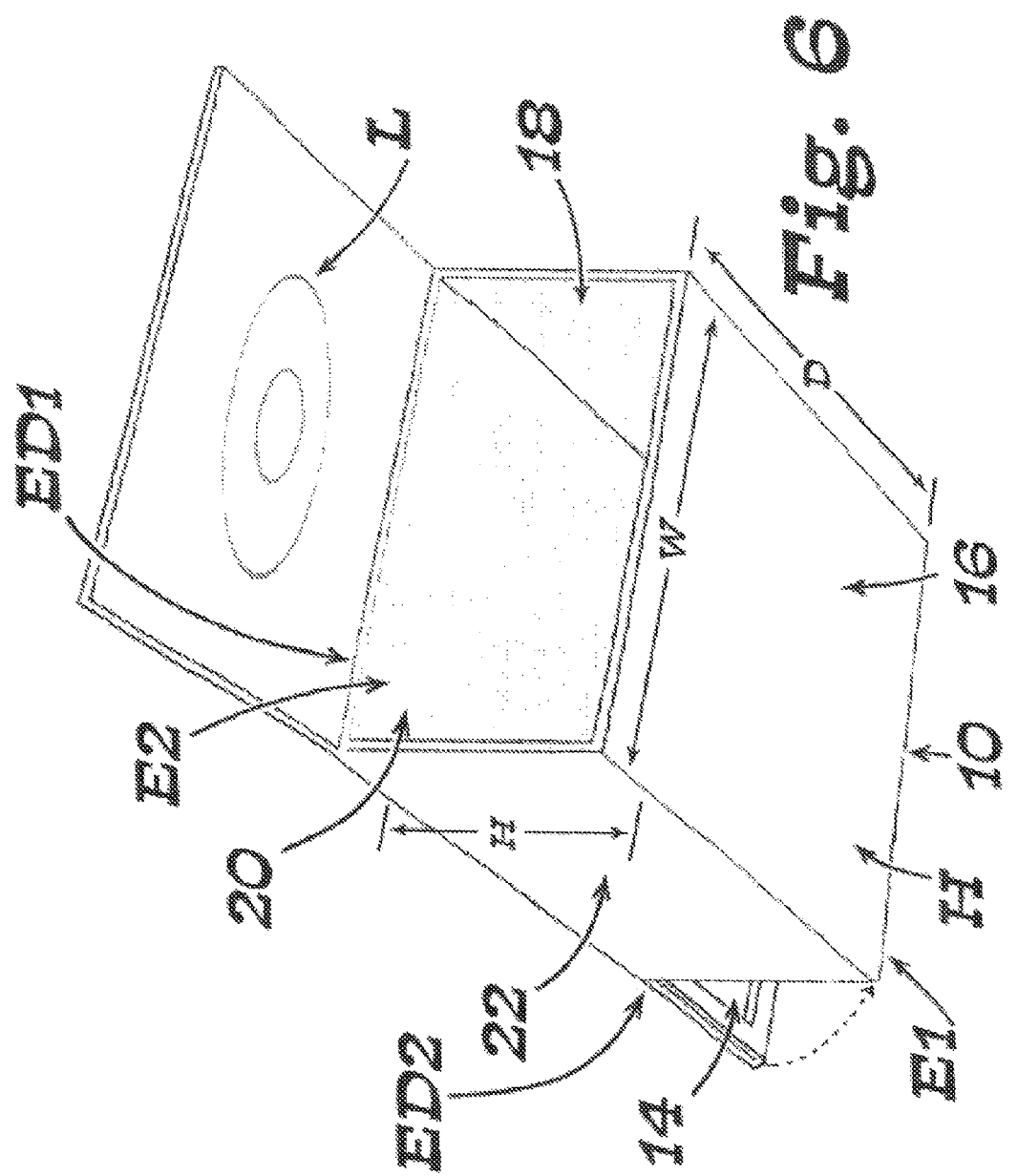

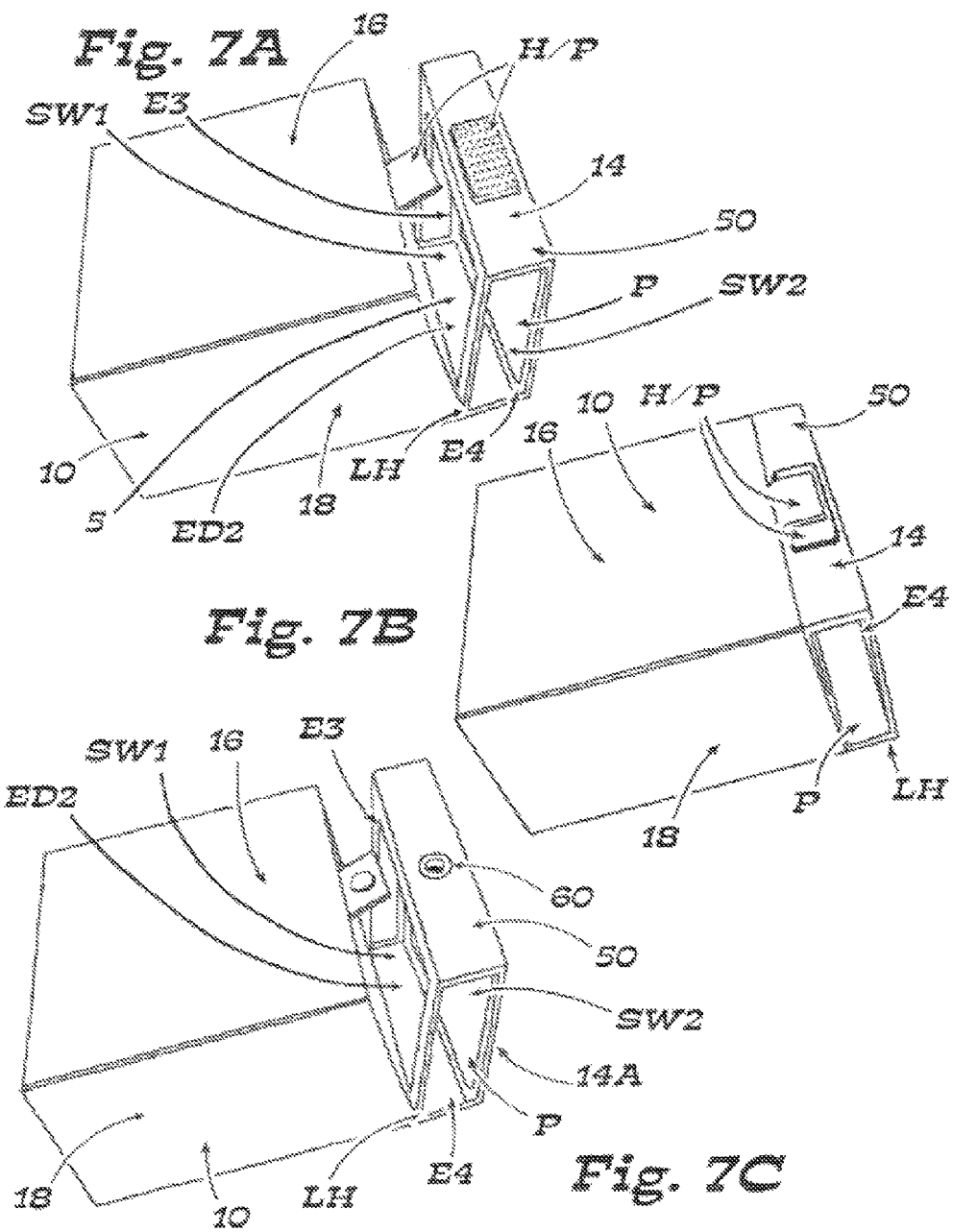

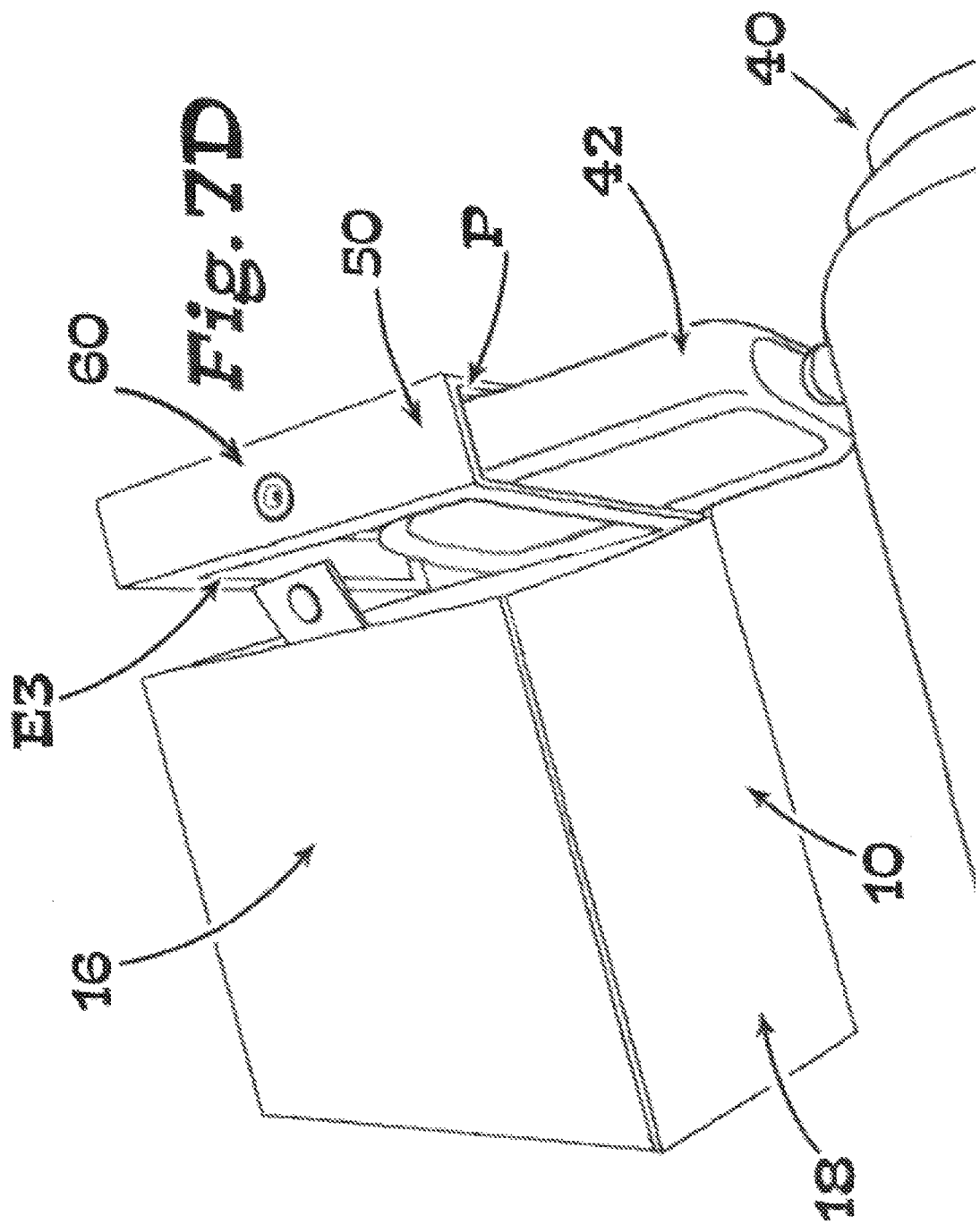

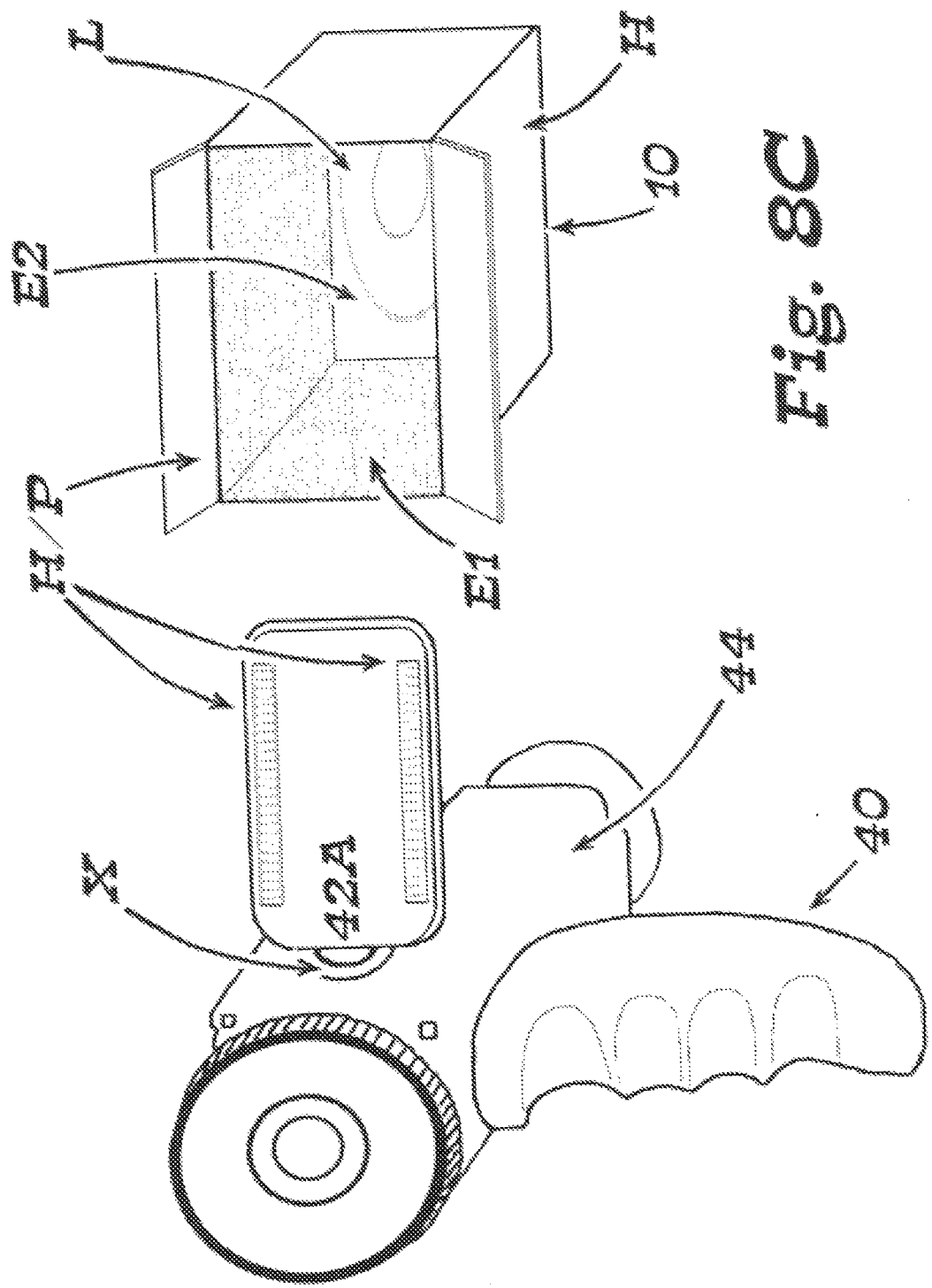

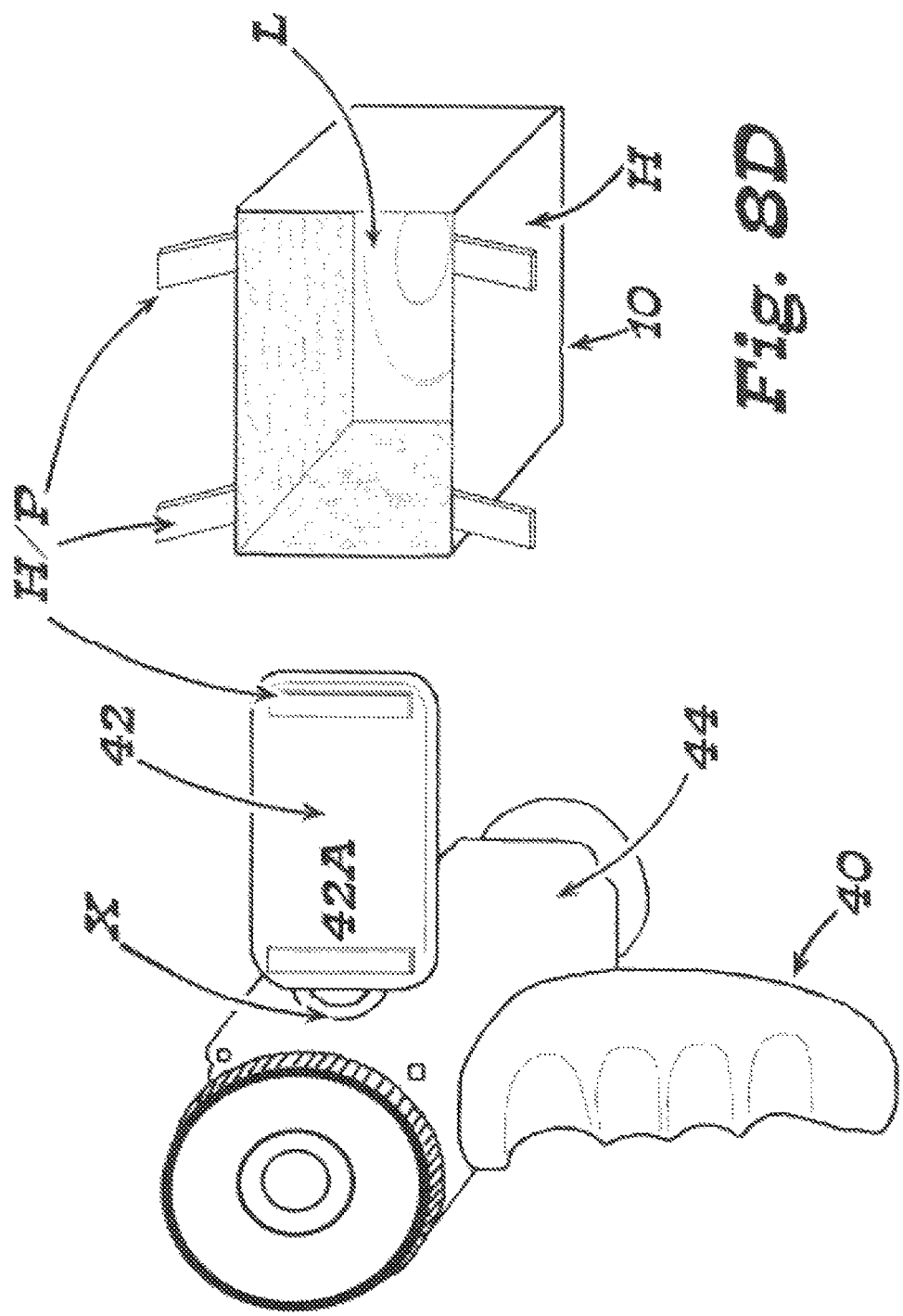

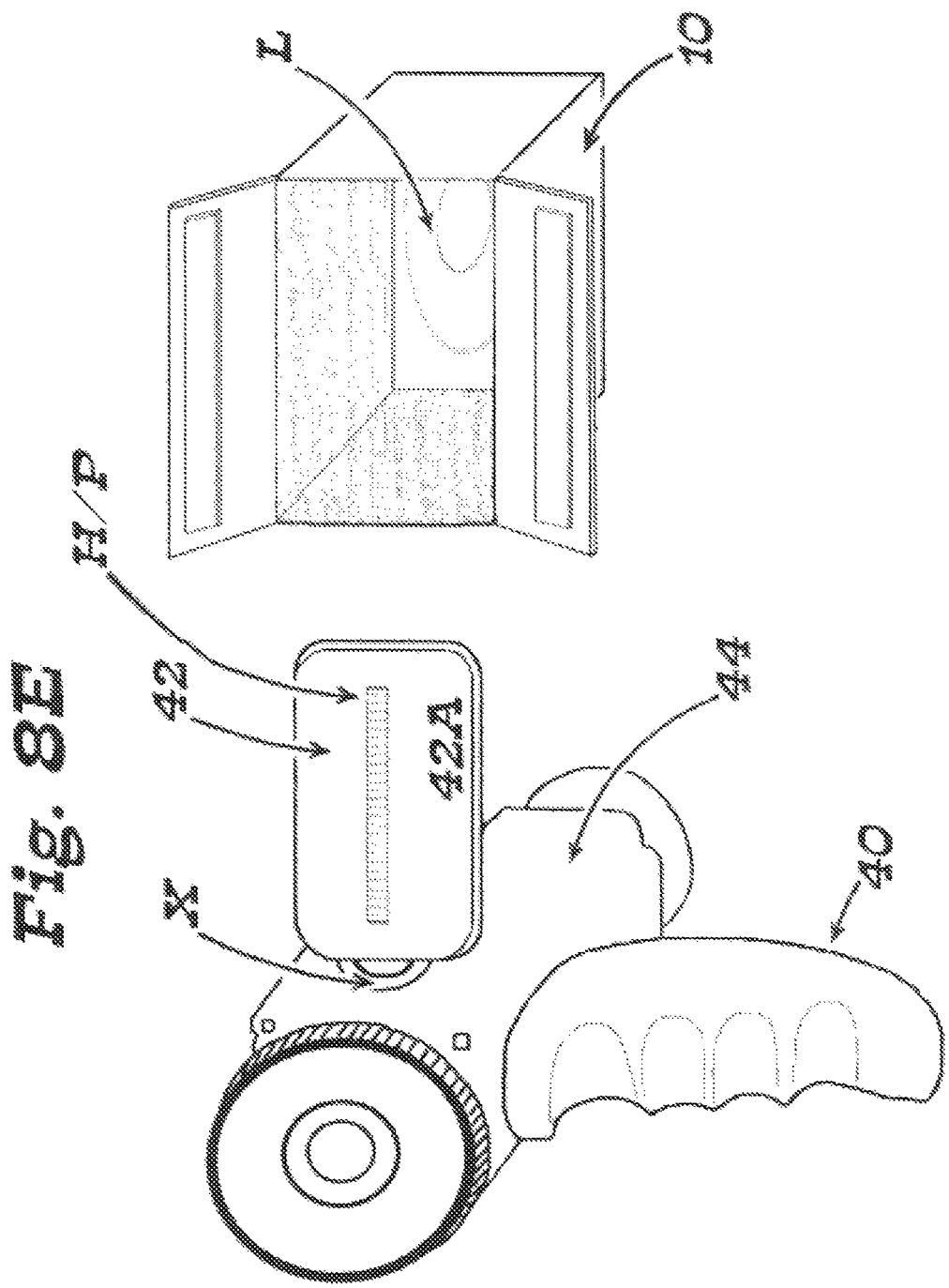

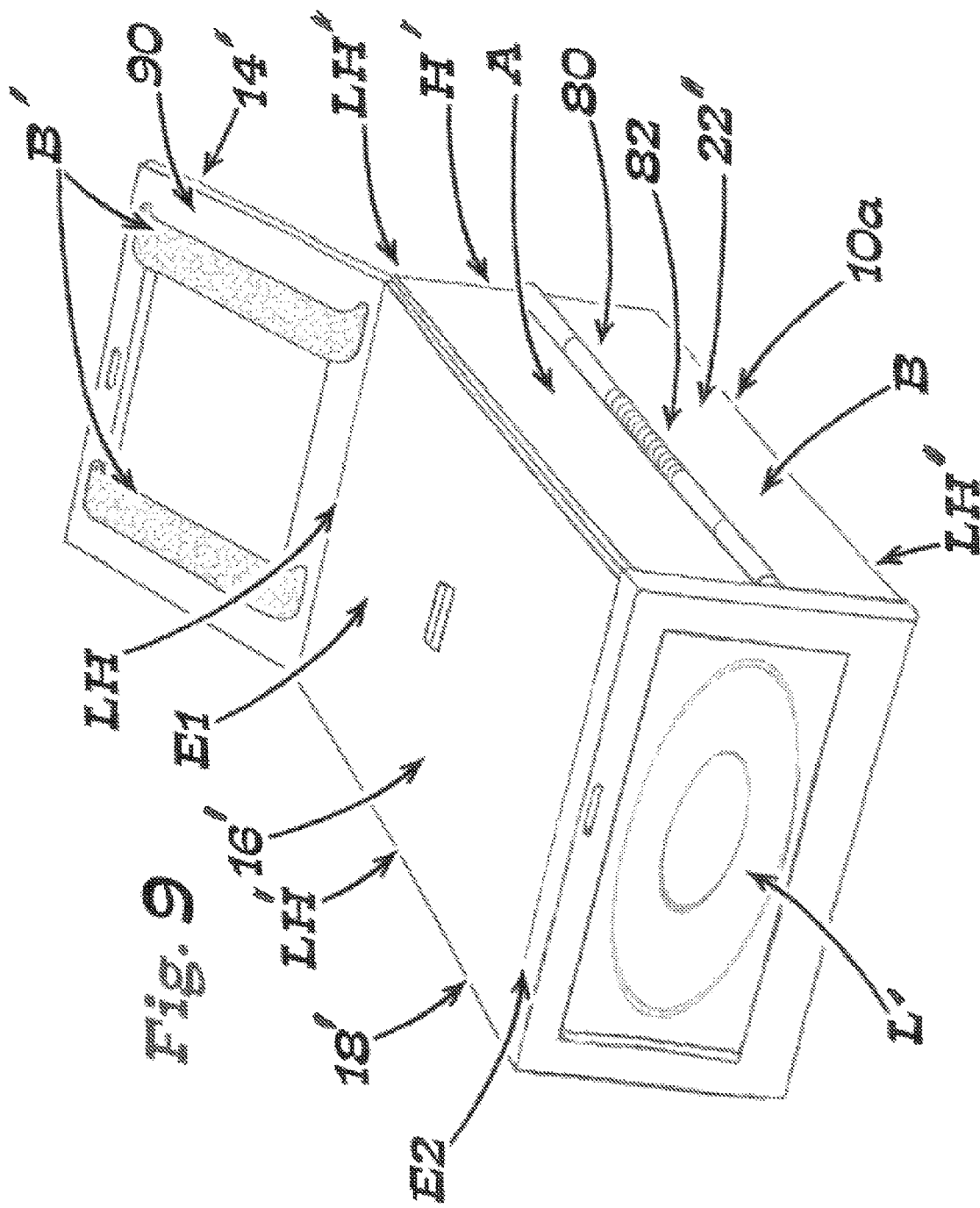

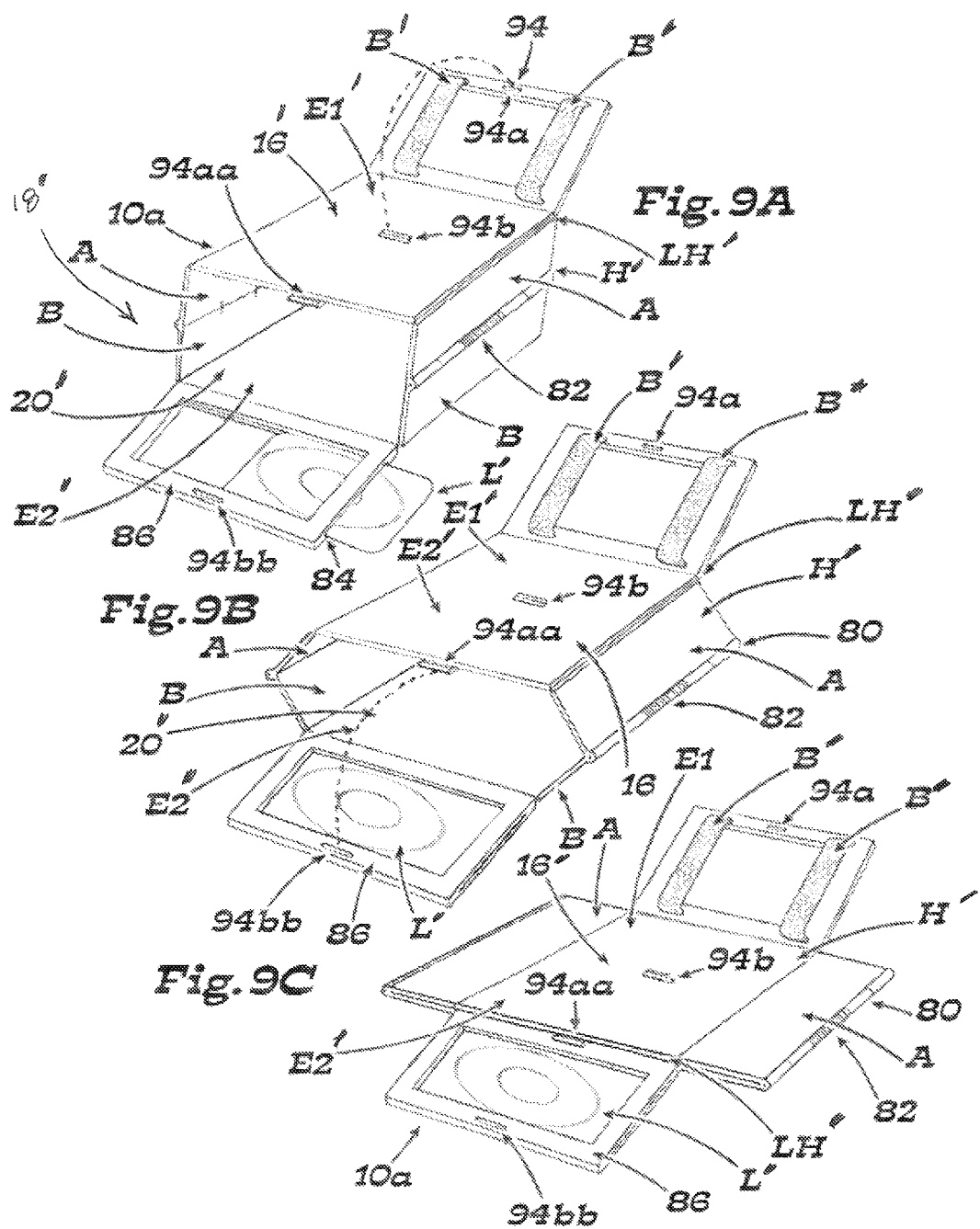

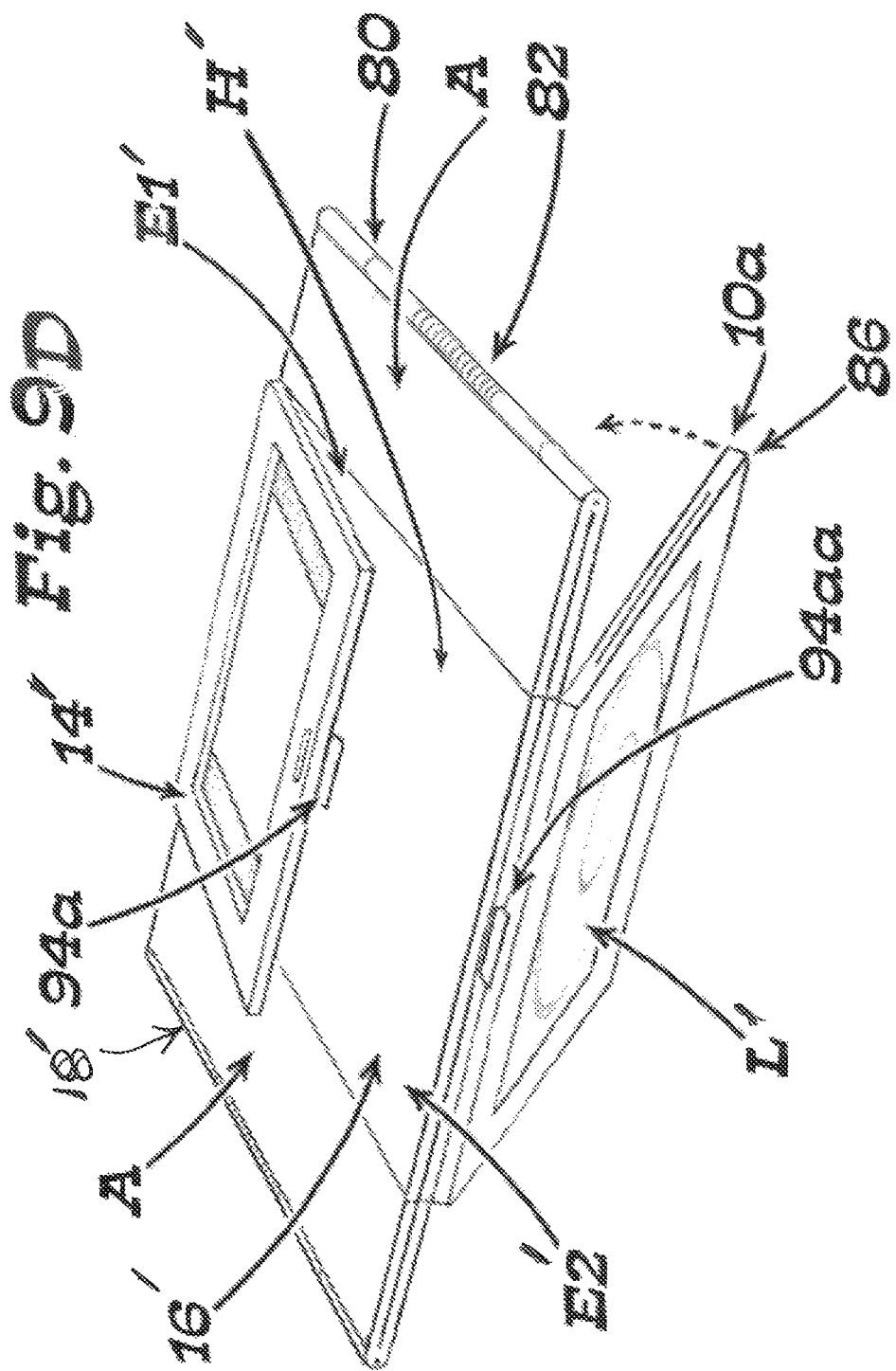

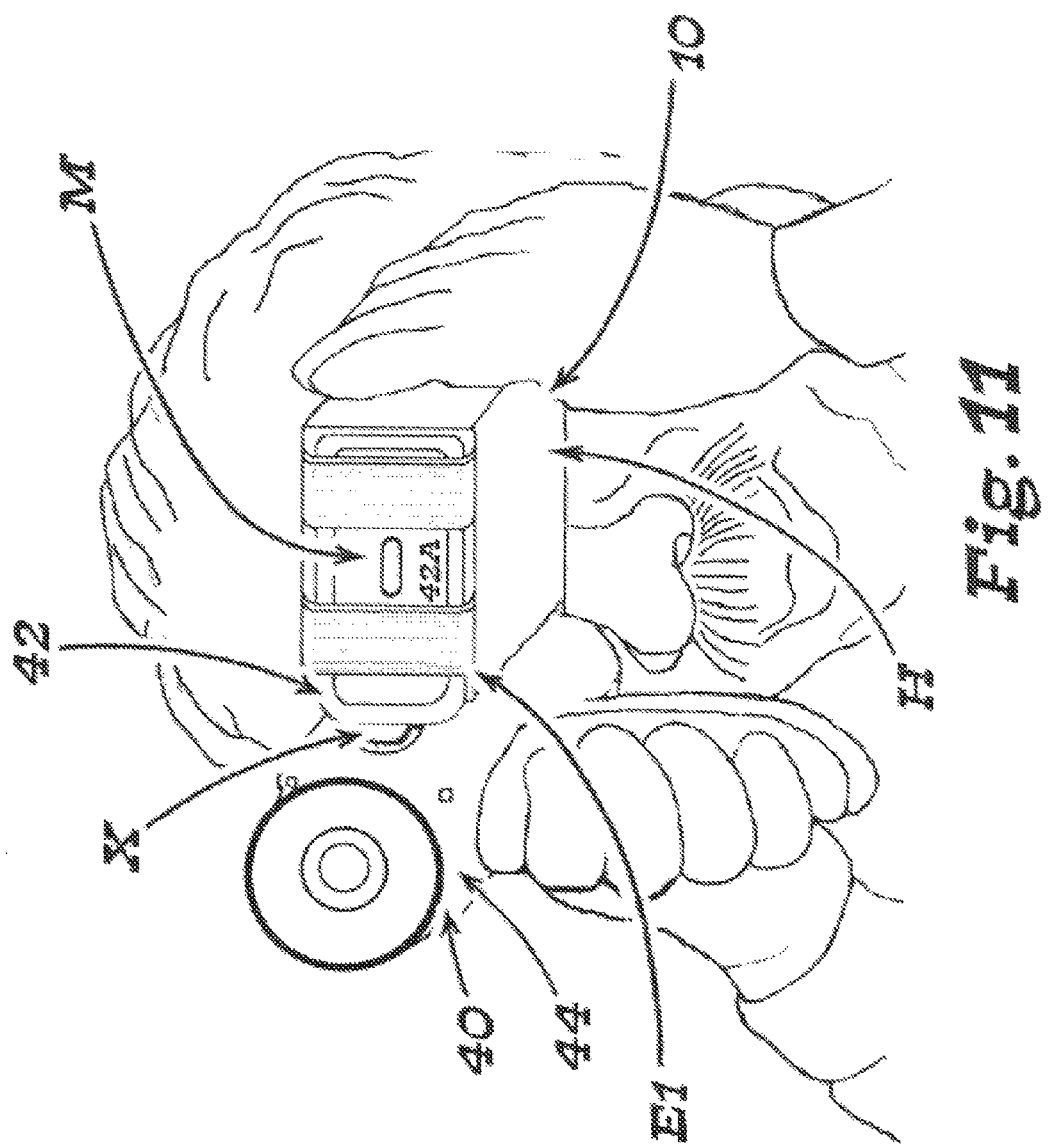

GLARE BLOCKING CAMCORDER/CAMERA STABILIZING EYE LEVEL VIEWFINDER DEVICE AND METHOD

RELATED PATENT APPLICATIONS & INCORPORATION BY REFERENCE

This utility application claims the benefit under 35 U.S.C. 119(e) of U.S. Provisional Patent Application No. 61/218,334, entitled "GLARE BLOCKING VIEWFINDER DEVICE AND METHOD," filed Jun. 18, 2009. This related application is incorporated herein by reference and made a part of this application. If any conflict arises between the disclosure of the invention in this utility application and that in the related provisional application, the disclosure in this utility application shall govern. Moreover, any and all U.S. patents, U.S. patent applications, and other documents, hard copy or electronic, cited or referred to in this application are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "rectangular" includes square.

The words "substantially" and "essentially" have equivalent meanings.

The word "camera" includes a camcorder, still camera, a video camera, and other similar devices for taking moving or still pictures or both.

BACKGROUND

Small, lightweight, commercially available hand-held cameras have side mounted, wing-like flat panel imagers or LCD monitor screens that are moveably attached to the camera body to pivot between a stored position and an outwardly extended position from the camera body during use. Images of the object being photographed are displayed on the monitor screen. These cameras do not have built-in eye level viewfinders, so the user normally holds the screen away from his or her eyes at a normal reading distance from about 12 to about 18 inches. However, it is difficult—often impossible—to see these screen images in glaring sunlight. Consequently, antiglare shields are sometimes used to cast a shadow on the screen, reducing glare that would wash out the screen image. For example, as taught in U.S. Pat. No. 6,419,367, a rigid device may be used that is inconvenient to store when not being used.

In addition to glare, another problem is camera stability. In general, the user holds such hand-held cameras with only one hand at a normal reading distance away from the eyes. Consequently, it is difficult to follow and capture acceptable images of fast action events like sports without some mechanism such as a tripod for stabilizing the camera. This, however, inhibits mobility. Moreover, since the screen is relatively small, it is difficult to see the image being displayed and track the action being recorded, especially for users with poor vision. Even many "professional" cameras with optical or digital viewfinders that have an ancillary flat panel monitor screens for displaying digital images, these digital images are unmagnified, difficult to see, and also prone to bright-light wash out.

SUMMARY

My glare blocking device and method has one or more of the features depicted in the embodiments discussed in the section entitled "DETAILED DESCRIPTION OF SOME ILLUSTRATIVE EMBODIMENTS." The claims that follow define my glare blocking viewfinder device and method of taking a picture using my device, distinguishing them from the prior art; however, without limiting the scope of my glare blocking device and method as expressed by these claims, in general terms, some, but not necessarily all, of their features are:

One, my glare blocking viewfinder device includes a shadow box having opposed first and second open ends and a predetermined depth dimension. There is a lens at the first end and an attachment mechanism at the second end. The depth dimension of the shadow box is substantially equal to the focal length of the lens.

Two, the lens is mounted to move between positions that cover and uncover the first end, which functions as the viewing end. The lens may be detachable or permanently affixed. In one embodiment, a substantially flat, thin, planar, rectangular lens is used that is mounted by a hinge to the shadow box to move through an arc of substantially 270° when moved in any one direction. For example, the lens may have an edge joined by a living hinge to the shadow box, folding and unfolding the lens to cover and uncover the first end. The lens may be a magnifying lens having a magnifying power, for example, of substantially from 2× to 5×.

Three, the attachment mechanism is adapted to detachably mount the device on a monitor screen of a camera. Upon mounting the device to the monitor screen a substantially rigid structure is provided that functions as a viewfinder substantially at the user's eye level. With the lens covering the first or viewing end, a user can observe the image-bearing surface of the screen at the second end of the shadow box by looking at it through the lens. The width and height dimensions of the lens, screen, and first and second open ends are all substantially equal in the embodiments illustrated. The attachment mechanism may have many forms. It may comprise at least one elastic member extending across the attachment end; it may include a magnet; it may comprise a hook and pile two-component connector; it may comprise an open sleeve with opposed open sidewalls and opposed open ends, enabling the monitor screen to be inserted into the sleeve through one end and images thereon to be viewed through the open sidewalls.

Four, my device has a closed, compact condition that, when in this condition, fits into a pocket of a user. In a folded, substantially planar state in which the shadow box is in the closed condition, the lens is folded inward to abut a surface of the closed shadow box. In one embodiment my device is maintained in this condition until a latch or latches are unlatched, and the device opens. For example, a spring-loaded hinge along a sidewall opens the shadow box automatically upon manual unlatching. In the open condition my device is mounted on a monitor screen to take pictures, and this assembly is very is stable, enabling the user to grasp the device with one hand and the camera with the other hand to track the movement of the subject and hold the assembly against the user's forehead next to the eye during viewing of the monitor screen.

My method of taking pictures uses a camera having a wing-like, side-mounted monitor. According to my method a user attaches my device to the monitor screen with the viewing lens positioned to cover the viewing end, and pressing his or her eye against the lens to view the monitor screen through the lens and shadow box, points the camera at a subject, keeping the camera on the subject by using the device as an eye level viewfinder. When using the embodiment of my device that has a folded and unfolded condition, the user first unfolds my device and the mounted it in the open condition to the screen by the attachment mechanism. The user holds the camera with one hand and the attached device with the other hand when following a subject being photographed, providing stability, control, and rapid tracking of the subject.

These features are not listed in any rank order nor is this list intended to be exhaustive.

DESCRIPTION OF THE DRAWING

Some embodiments of my device and method are discussed in detail in connection with the accompanying drawing, which is for illustrative purposes only. This drawing includes the following figures (FIGS.), with like numerals indicating like parts:

FIG. 1 is a perspective view of one embodiment of my glare blocking viewfinder device in a folded, substantially planar state.

FIG. 2 is a view depicting my device folded as shown in FIG. 1 and being inserted into a shirt pocket of a user.

FIG. 3 is a perspective view of the embodiment of my device depicted in FIG. 1 partially unfolded and looking at a topside of my device with its shadow box closed.

FIG. 4 is a perspective view of the embodiment of my device depicted in FIG. 1 partially unfolded but looking at a bottom side of my device with its shadow box closed.

FIG. 5 is a perspective view of the embodiment of my device depicted in FIG. 1 almost completely unfolded and its shadow box partially opened.

FIG. 6 is a perspective view of the embodiment of my device depicted in FIG. 1 completely unfolded and its shadow box completely opened.

FIG. 7A is a perspective view showing the embodiment of my glare blocking viewfinder device shown in FIG. 1 with its sleeve attachment mechanism partially unfolded.

FIG. 7B is a perspective view similar to FIG. 7A showing my glare blocking viewfinder device depicted in FIG. 1 with its sleeve attachment mechanism folded and latched in position to completely cover an open end of the shadow box.

FIG. 7C is a perspective view showing an alternate embodiment of my glare blocking viewfinder device using a sleeve attachment mechanism similar to that shown in FIGS. 7A and 7B employing a magnetic latch.

FIG. 7D is a perspective view of the embodiment of my glare blocking viewfinder device depicted in FIG. 7D showing the monitor screen of a hand held camera being inserted into a pocket of my device.

FIG. 8C is a perspective view showing another embodiment using a hook and pile attachment mechanism to detachably mount my device on the monitor screen of a hand-held camera.

FIG. 8D is a perspective view showing yet another arrangement of a hook and pile attachment mechanism to detachably mount my device on the monitor screen of a hand-held camera.

FIG. 8E is a perspective view showing still another arrangement of a hook and pile attachment mechanism to detachably mount my device on the monitor screen of a hand-held camera.

FIG. 9 is a perspective view of yet another embodiment of my glare blocking viewfinder device.

FIG. 9A is a perspective view of my glare blocking viewfinder device of FIG. 9 partially unfolded and showing the lens being inserted into a slot of a frame attached to the shadow box.

FIG. 9B is a perspective view of my glare blocking viewfinder device of FIG. 9 showing opposed sidewalls of the shadow box partially collapsed.

FIG. 9C is a perspective view of my glare blocking viewfinder device of FIG. 9 showing the shadow box completely collapsed.

FIG. 9D is a perspective view of my glare blocking viewfinder device of FIG. 9 showing its wall including the lens and the sleeve attachment mechanism is folded over the collapsed shadow box.

FIG. 11 is a perspective view of a user recording an action event with a hand-held camera equipped with an embodiment of my device using the one version of the attachment mechanism illustrated in FIG. 8A.

Figure 8A:
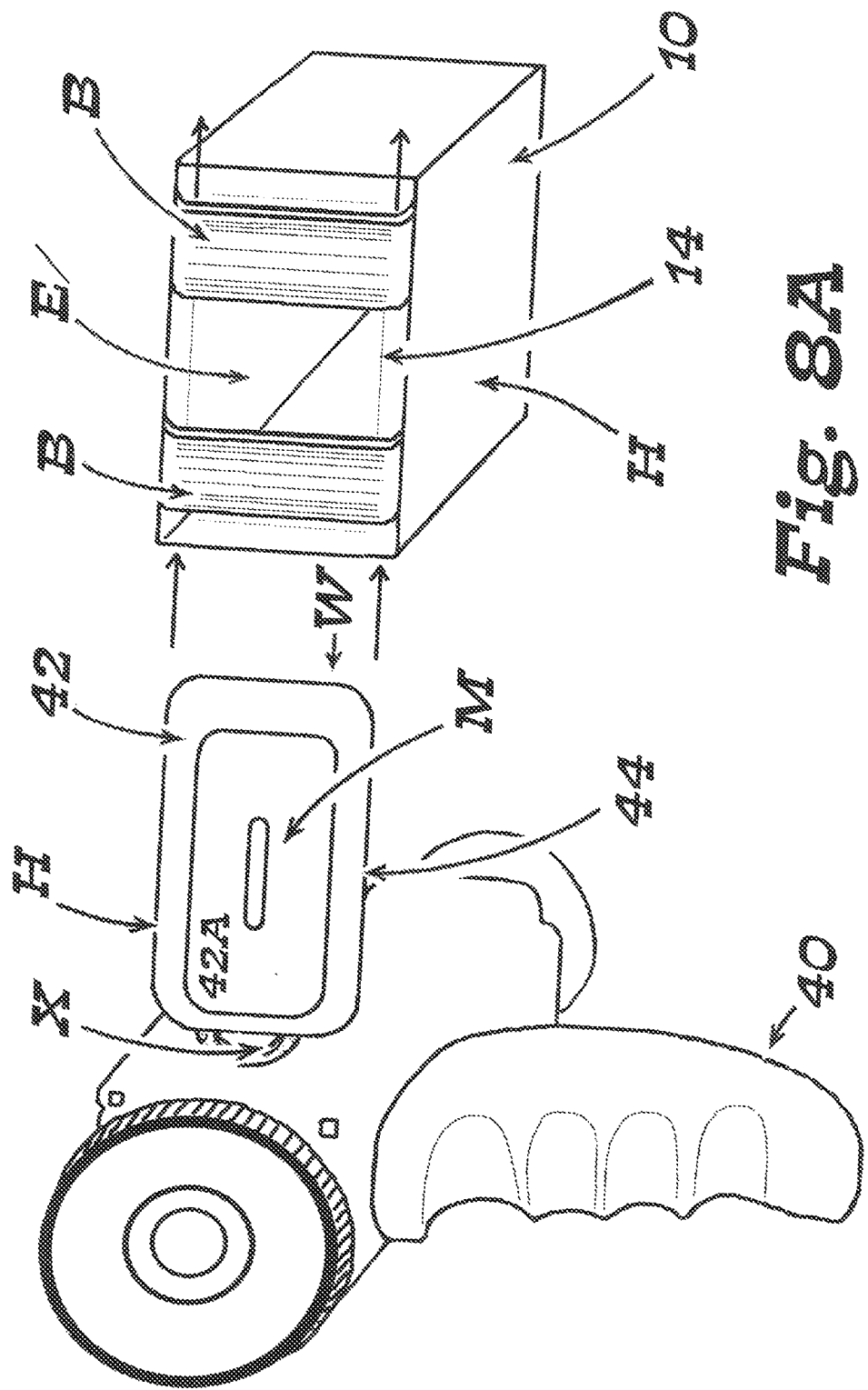
FIG. 8A is a perspective view showing an alternate embodiment using an elastic band attachment mechanism to detachably mount my device on the monitor screen of a hand-held camera.

Although the camera 40 illustrated is hand-held, the camera may be mounted to a tripod or monopod.

DETAILED DESCRIPTION OF SOME ILLUSTRATIVE EMBODIMENTS

As illustrated in FIGS. 1 through 10, my device 10 conveniently slides on and off a monitor screen 42 of a hand held camera 40. (Although the camera 40 illustrated is hand-held, the camera may be mounted to a tripod or monopod). My device 10 blocks glare, provides an eye level viewfinder, magnifies the image on the monitor screen 42, and stabilizes the camera 40. It is particularly advantageous when using the hand-held video camera 40 to capture pictures of, for example, outdoor or indoor, fast action, dynamic events such as sporting contests and the like. My device 10 is adapted to be detachably mounted on a side mounted, panel-type, monitor screen 42 of the camera 40. As shown in FIG. 8A, this monitor screen 42 may include a microphone M in an outer, non-imaging surface 42*a* of the screen 42. The image-bearing surface (not shown) is opposite the surface 42*a*. As shown in FIG. 8A, this monitor screen 42 is substantially flat and rectangular and has a width w substantially from 2.5 to 4 inches and a height h substantially from 2.5 to 3.5 inches. Its thickness is typically substantially from ⅛ to ¼ inch. The panel monitor screen 42 may be attached to a side of the body 44 of the camera 40 by a pivot mounting X (FIG. 11).

Such small, hand-held cameras usually do not have an eye level viewfinder, thus requiring the user to hold the camera away from the eyes the normal reading distance. My device 10 functions as a viewfinder as illustrated in FIG. 11 by a user holding his or her eye up against a transparent magnifying lens L, which may be permanently attached to or integral with a collapsible shadow box H. In an alternate embodiment depicted in FIGS. 9 through 9E the lens is detachably mounted to the shadow box H. The lens L, because it is hingedly attached to the shadow box H, is capable of flipping over to cover an open end E2 or instantly flipping out of the way onto a top wall 20 (or bottom wall) of the shadow box H. The lens L may be a Fersnel lens.

My device 10 may be made of a sheet of plastic or other material that lends itself to formation of the shadow box H using thermoplastic manufacturing techniques as an integral, single piece construction. As illustrated best in FIGS. 1 through 6, the shadow box H may comprise four opaque walls 16, 18, 20, and 22 that are joined, for example, by a living hinge LH (FIG. 5) along longitudinal edges of each pair of adjacent walls 16, 18 and 18, 20 and 20, 22 and 22, 16. The shadow box H has opposed open ends E1 and E2. The end E1 is the attachment end to which the monitor screen 42 is detachably mounted and the end E2 is the viewing end that the user holds against his or her eye when viewing an image on the monitor screen as illustrated in FIG. 11. The lens L is substantially flat, thin and rectangular, and is integral with the shadow box H, being, as shown in FIG. 5, hingedly mounted by a living hinge LH to the end E2 along the one edge ED1 of the shadow box H wall 20. A suitable lens L is a Fresnel lens because it is very thin, flat and is available in a wide range of magnifying powers, for example, in my device 10, acceptable magnification is substantially from 2× to 5×. The lens L is permanently affixed to the shadow box H and folds and unfolds to cover and uncover the open viewing end E2, the lens moving through an arc of substantially 270° when moved in a clockwise or counter-clockwise direction.

Figure 8B:
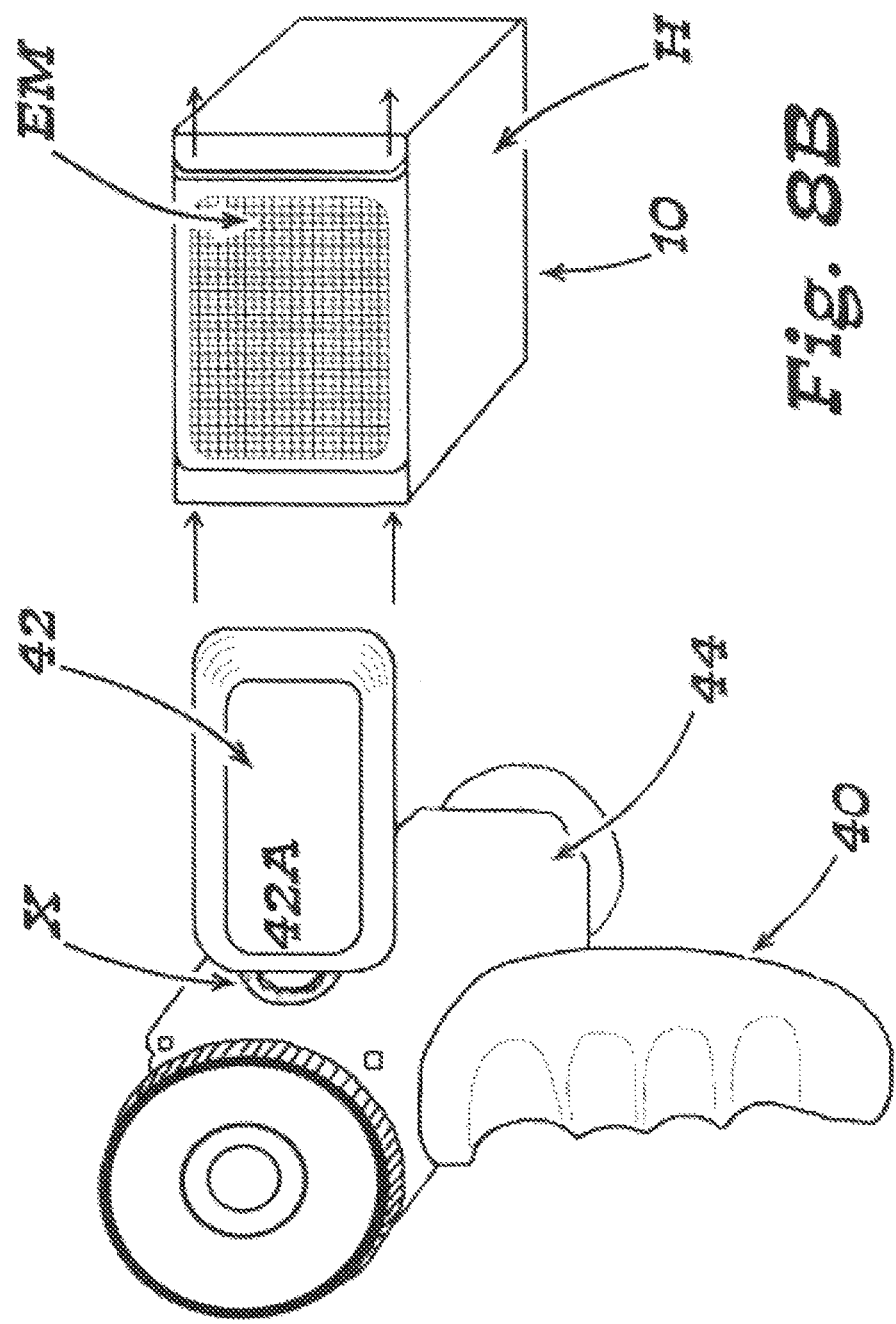
FIG. 8B is a perspective view showing still another alternate embodiment using an elastic mesh attachment mechanism to detachably mount my device on the monitor screen of a hand-held camera.
Figure 8F:
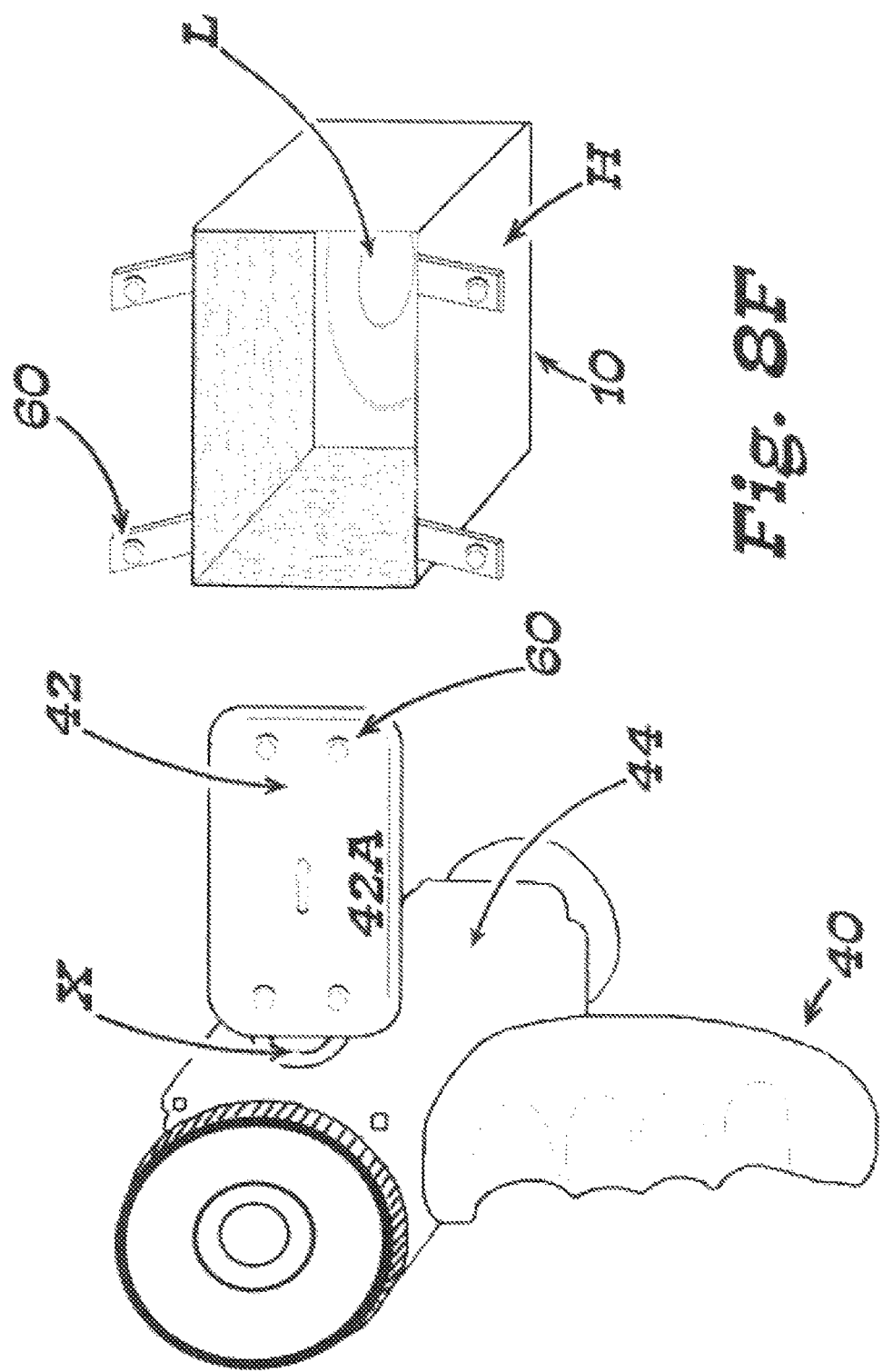
FIG. 8F is a perspective view showing an embodiment of my glare blocking viewfinder device using a magnetic attachment mechanism to detachably mount my device on the monitor screen of a hand-held camera.

When my device 10 is in a completely folded state as shown in FIG. 1, it may be conveniently and safely placed in a shirt pocket of a user as depicted in FIG. 2. In FIG. 6 my device 10 is shown in its completely unfolded state with the shadow box H open completely. When in the unfolded state as shown in FIGS. 8A through 8F, my device 10 is detachably connected to the monitor screen 42 projecting substantially at a right angle to the body 44 of the camera 40 by attaching means at the end E1 of the shadow box H. Any suitable attaching means may be used, and the following are examples of such attaching means: The embodiment shown in FIGS. 7A through 7C depict using a hinged sleeve attachment mechanism 14; the embodiment shown in FIG. 8A depicts using a pair of elastic bands B; the embodiment shown in FIG. 8B depicts using an elastic mesh EM attachment mechanism; the embodiments shown in FIGS. 8C through 8E depict using different versions of hook and pile H/P attachment mechanisms; and FIG. 8F depicts using magnets 60 as the attachment mechanism.

In the embodiment illustrated in FIGS. 7A and 7B, the sleeve attachment mechanism 14 comprises an open wall structure 50 forming a pocket P that receives the screen 42. As illustrated best in FIG. 7A, the wall structure 50 is attached by a living hinge LH to the wall 20 along the edge ED2 and folds over the open end E1 when the shadow box H is in an open condition as shown in FIG. 6. Alternately, sleeve attachment mechanism may be attached by flexible narrow elastic strips. The monitor screen 42 is inserted into the pocket P to detachably mount my device 10 when the screen projects substantially at a right angle to the body B of the camera 40 as shown in FIGS. 8A through 8F. The opposed sidewalls SW1 and SW2 are open. Consequently, when my device 10 is mounted on the monitor screen 42, the images being displayed on the monitor screen 42 may be observed through the lens L and a microphone M (FIG. 8A) in the outer surface 42a of the screen is uncovered.

Upon detaching by removal of the screen 42 from the pocket P, the wall structure 50 is folded inward towards the collapsed shadow box H. It may be first be folded to overlie the outer surface of the wall 20. Or, as shown in FIG. 1, to overlie the folded up lens L—an ideal folded condition where the wall structure 50 at least partially covers and protects the lens L that has been folded inward to abut an outer surface of the wall 20 before the wall structure 50 is folded inward. In either completely folded up arrangement, my device 10 is in a substantially planar state. In FIGS. 7A and 7B a hook and pile H/P two-component latch is depicted. In FIGS. 7C and 7D magnets 60 are used as a two-component latch. These two-component latches hold the wall structure 50 in the closed position after the monitor screen has been inserted into the pocket P.

In the embodiment illustrated in FIG. 8A, the pair of elastic straps or bands B eliminate use of the wall structure 50. The pair of elastic bands B are spaced apart and stretch across the width of the open end E1 over the exterior surface 42a of the monitor screen 42 inserted underneath the bands B, mounting my device 10 on the screen.

FIG. 8B depicts an elastic mesh EM stretching across the width of the open end E1 over the exterior surface 42a of the monitor screen 42 inserted underneath the mesh, mounting my device 10 on the screen. This mesh EM permits audio transparency for those wing-like monitor screen 42 having their microphones M placed on the surface 42a of the screen. This mesh EM is the equivalent of a flexible shadow box of like dimensions and elasticity but no openings, eliminating the need to provide openings for microphones.

FIGS. 8C through 8E depicts different arrangements of hook and pile H/P two-component connectors as the attachment mechanism. The pile may be on hinged flaps along the open end E1 and the hooks may be fastened to the outer, non-viewing surface 42a of the monitor screen 42.

As shown best in FIG. 6, in the open state, the shadow box H may have dimensions substantially as follows: a width w from 3 to 6 inches, a height h from 3 to 5 inches, and a depth d from 3 to 6 inches. The width w and height h of the shadow box H are substantially the same as the width and height dimensions of the monitor screen 42. The depth d of the shadow box H is substantially equal to the focal length of the lens L, which substantially ranges from 3 to 5 inches. Typically the lens has a magnifying power of 2× to 5×. Because of the relationship of the depth d of the shadow box H to the focal length of the lens L, the user can hold his or her eye next to the lens L and against the user's forehead as shown in FIG. 11. When a wider shadow box H is used, for example substantially from 3.5 to 5 inches, both eyes may be used to view the monitor screen. With the advent of 3D cameras, my device can be adapted to provide separate left and right eye images as the camera shoots a 3D picture. Using my device 10 as an eye-level viewfinder and holding the camera 40 steady with both hands, in this example, the user grasps my device with the left hand and holds the camera with the right hand. And with my device 10 so mounted to the camera 40, the shadow box's function is to block sunlight directly impinging on the image-bearing surface (not shown) of the monitor screen 42. This prevents glare so the user can see the image-bearing surface of the monitor screen 42 without sunlight interfering with, or washing out, the screen image or the user's vision.

An alternate embodiment of my device designated by the numeral 10a is illustrated in FIGS. 9 through 9D. My device 10a is similar in most respects to my device 10 discussed above, except its shadow box H' includes opposed collapsible, opaque sidewalls 18' and 22'. Each of these sidewalls 18' and 22' are divided into substantially equal sized rectangular segments A and B that are connected by an elongated hinge 80 with a coiled or other type spring 82 along its length. A living hinge with tension acting spring also may be used. The shadow box H' also includes two additional opaque walls 16' and 20'. As illustrated in FIGS. 9A through 9D, these walls 16', 18', 20' and 22' are joined along longitudinal edges of each pair of adjacent walls 16', 18' and 18', 20' and 20', 22' and 22', 16' by, for example, a living hinge LH'. The shadow box H' has opposed open ends E1' and E2'. The end E1' is the attachment end and the monitor screen 42 is detachably mounted thereto using a sleeve attachment mechanism 14' connected by a living hinge LH' to the end E1' of the shadow box H'. The sleeve attachment mechanism 14' has a frame 90 with a pair of elastic bands B' stretched across the frame. The end E2' is the viewing end that the user holds against his or her eye or eyes when viewing an image on the monitor screen 42 as illustrated in FIG. 11. In this embodiment a lens L' is detachably mounted for replacement at low costs if damaged and slides into a slot 84 in a frame 86 attached by a living hinge LH' to the end E2' of the shadow box H'.

As best depicted in FIGS. 9A through 9D, my device 10a is folded into a substantially flat, planar structure. There are two-component latches 94 that engage upon folding my device 10a and hold it in this flat and planar condition until unlatched. Each latch 94 has one component on one wall and on an opposed wall the other component. For example, a suitable two-component latch 94 may comprise a finger 94a as one component and a channel 94b as the other component, with the finger fitting tightly in the channel until manually levered to disengage. These latches 94 upon being engaged hold my device 10a in the flat and planar condition until unlatched. Then the spring 82 automatically unfolds my device 10a into the condition shown in FIG. 9A. The latch 94 at the end E1' between the frame 86 and the top wall 16' is, however, re-latched by engaging the finger 94aa and the channel 94bb to position the lens L' as shown in FIG. 9. This properly positions the lens' with respect to the shadow box H'.

Figure 10A:
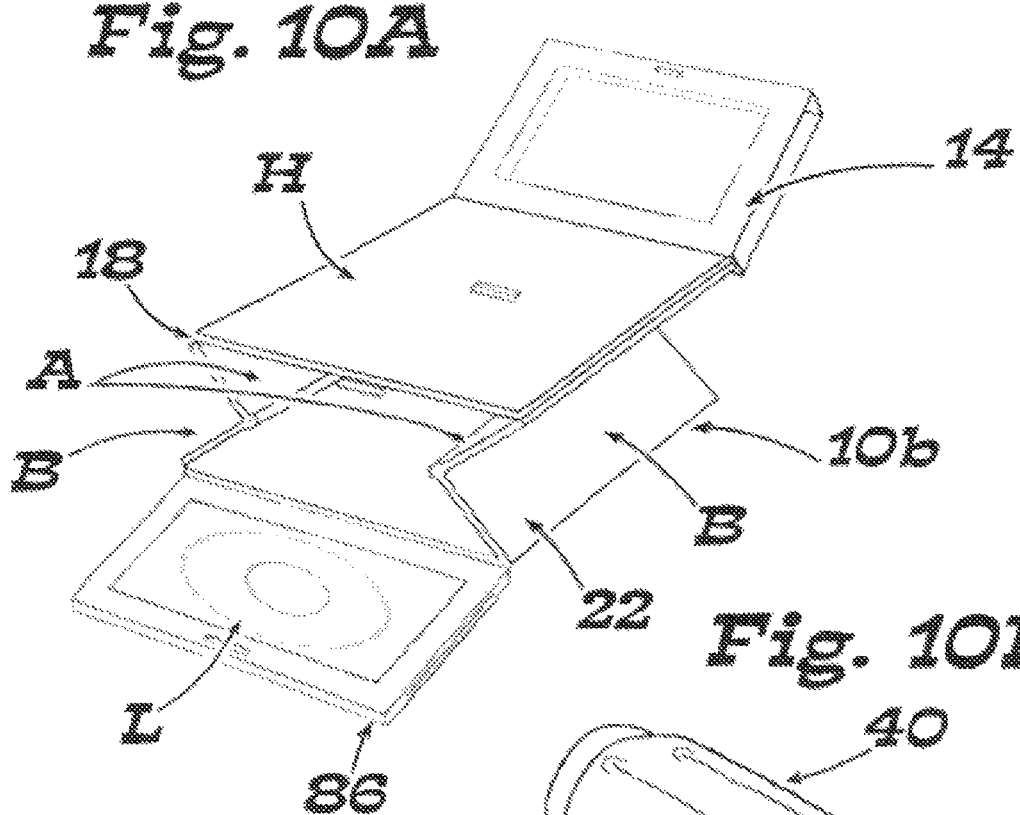
FIG. 10A is a perspective view of an other embodiment of my glare blocking viewfinder device similar to that shown in FIG. 9.
Figure 10B:
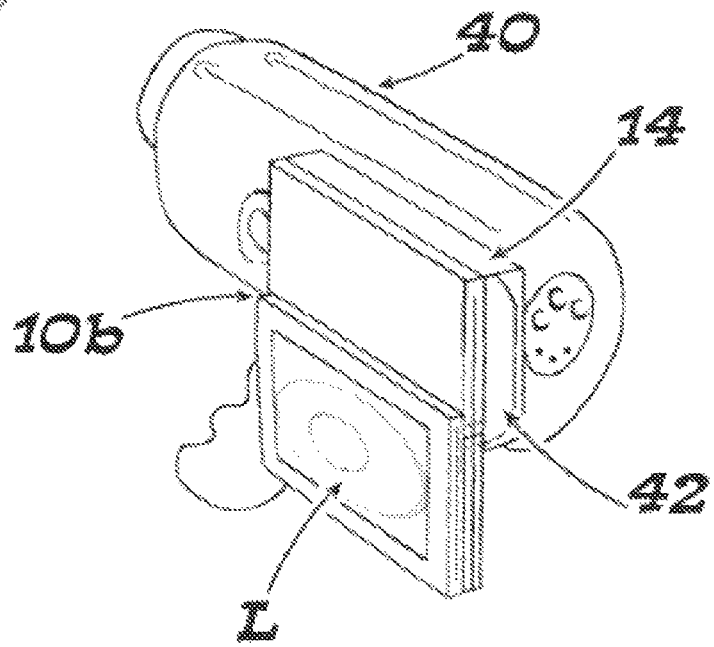
FIG. 10B is a perspective view of the embodiment of my device shown in FIG. 10A mounted for storage on a hand-held camera

Still another alternate embodiment of my device designated by the numeral 10b is illustrated in FIGS. 10A and 10B. My device 10b is similar in most respects to my device 10a discussed above except it employs hinges 82' that fold the sidewalls 18' and 22' inward. When completed folded into a compact structure, my device 10b is conveniently mounted by its sleeve attachment mechanism 14' to a folded inward monitor screen 42 of the camera 40 as illustrated in FIG. 10B.

To use a camera equipped with my device 10, a user presses his or her an eye or eyes against the lens L to view the image-bearing surface of the monitor screen 42 through the lens L and points the camera 40 at, and follows a moving subject, keeping the camera steady and on the subject by using my device 10 as an eye level viewfinder. Thus, while the user holds the combination of the camera 40 and my device 10 steady with both hands (one hand gripping the camera and the other hand gripping my device), he or she moves the camera in a controlled manner to follow the action with the camera and simultaneously views the event or subject through my device's viewfinder lens L that magnifies the image on the camera's screen. My device 10 is sufficiently rigid for pressing against the user's face for acquiring fast action images yet instantly collapsible for storage in a shirt pocket.

Upon detaching by removal of the screen 42 from the attachment means of any of the embodiments, the shadow box is collapsed. In the case of the sleeve attachment mechanism 14, the wall structure 50 may be first folded to overlie the outer surface of the wall 20. Or, as shown in FIG. 1, to overlie the folded up lens L—an ideal folded condition where the sleeve attachment mechanism 14 at least partially covers and protects the lens that has been folded inward to abut an outer surface of a wall before the wall structure 50 is folded inward.

My device can also be configured to fold flat and be attached to the camera or the back of the wing viewfinder for carrying convenience without interfering with the functioning of the camera in its normal mode. It can then be erected for use as the glare blocking and magnifying device as described herein. In just about any folded up arrangement, each one of the embodiments my device are in a substantially planar state. My device provides a quick on/off stabilizing and magnifying eye level viewfinder that is foldable, small and flat enough to fit in a man's shirt pocket.

SCOPE OF THE INVENTION

The above presents a description of the best mode I contemplate of carrying out my device and method and of the manner and process of making and using them, in such full, clear, concise, and exact terms as to enable any person skilled in the art to to make and use my device and method. My device and method are, however, susceptible to modifications and alternate constructions from the illustrative embodiments discussed above which are fully equivalent. Consequently, it is not my intention to limit my device and method to the particular embodiments disclosed. On the contrary, my intention is to cover all modifications and alternate constructions coming within the spirit and scope of my device and method as generally expressed by the following claims, which particularly point out and distinctly claim the subject matter of my invention:

The invention claimed is:
1. A glare blocking viewfinder device adapted to be detachably mounted on a monitor screen of a camera, said monitor screen being substantially flat and rectangular and having predetermined width and height dimensions, said device including:
    a collapsible shadow box with an open attachment end and an open viewing end with predetermined width, height, and depth dimensions defined by four rectangular sides and each of the sides being joined by living hinges along longitudinal edges of each pair of adjacent walls and further defining a left and a right side and an upper and a lower side to form the shadow box,
    a substantially flat, thin, rectangular lens hingedly mounted by a living hinge at the viewing end to one of the upper or lower sides of the shadow box and an attachment mechanism mounted by a living hinge at the attachment end that is adapted to attach the device to the side mounted monitor screen to substantially cover the viewing end with the screen and enable a user to observe an image-bearing surface of the screen by looking at the image-bearing surface though the lens when said lens covers the viewing end,
    said lens having a predetermined focal length and a generally rectangular configuration having width and height dimensions substantially the same as said predetermined width and height dimensions of the screen, said shadow box having a closed condition by rotation of the hinges that attach the sides of the shadow box and an open condition providing a shadow structure having width and height dimensions substantially the same as the width and height dimensions of the monitor screen and a depth that is substantially equal to the predetermined focal length of the lens, said device having a folded, substantially planar state in which the shadow box is in the closed condition and the lens is folded to abut a surface of the closed shadow box and an unfolded state when the shadow box is open and the attachment mechanisms holds the open shadow box on the monitor screen, providing a substantially rigid structure with the lens positioned to substantially cover the open viewing end to form a viewfinder substantially at the user's eye level.

2. The glare blocking viewfinder device of claim 1 where the lens has a magnifying power of 2× to 5×.

3. The glare blocking viewfinder device of claim 2 wherein the living hinges are part of thermoplastic molding of adjacent parts and where the lens folds and unfolds to cover and uncover the open viewing end, said lens moving through an arc of substantially 270° when moved in any one direction said folding being from the in use position substantially covering the open viewing end through the 270° to the closed position being parallel to the side of the shadow box to which it is hingedly attached by said living hinge and returning to the open condition.

4. The glare blocking viewfinder device of claim 1 where the attachment mechanism comprises at least one elastic member extending across the attachment end.

5. The glare blocking viewfinder device of claim 1 where the attachment mechanism includes a magnet.

6. The glare blocking viewfinder device of claim 1 where the attachment mechanism comprises a hook and pile two-component connector.

7. The glare blocking viewfinder device of claim 1 where the attachment mechanism comprises an open sleeve with opposed open sidewalls and opposed open ends, enabling the monitor screen to be inserted into the sleeve through one end and images thereon to be viewed through the open sidewalls.

8. The glare blocking viewfinder device of claim 1 where the width dimension is sufficient to accommodate both eyes viewing the monitor screen at the same time.

9. The glare blocking viewfinder device of claim 8 where the width dimensions is substantially from 3.5 to 5 inches.

10. A method of taking pictures with a camera having a side mounted monitor, said method comprising
attaching the device of claim 1 to the monitor screen with the lens positioned to cover the viewing end, and
positioning the lens in a view finder orientation relative to the eye of a user to view the monitor screen through the lens and shadow box and pointing the camera at the subject, keeping the camera on the subject by using the device as a viewfinder.

11. The method of claim 10 where the shadow box has a width dimension that is sufficient to enable viewing the monitor screen by both eyes of a user.

12. The glare blocking viewfinder device of claim 11 where the width dimension is substantially from 3.5 to 5 inches.

* * * * *